United States Patent
Johnston

[11] 3,863,009
[45] Jan. 28, 1975

[54] CERTAIN GLYCINE DERIVATIVES AS POTENTIATARS FOR TETRACYCLINES

[75] Inventor: Charles Johnston, Midland, Mich.

[73] Assignee: The Dow Chemical Company, Midland, Mich.

[22] Filed: Oct. 3, 1966

[21] Appl. No.: 583,942

[52] U.S. Cl.................. 424/227, 424/317, 424/319
[51] Int. Cl............................................. A61k 21/00
[58] Field of Search............ 260/519; 424/227, 317, 424/319; 99/2

[56] References Cited
UNITED STATES PATENTS

| | | | |
|---|---|---|---|
| 2,806,789 | 9/1957 | Kiser et al.................................. | 99/2 |
| 3,282,779 | 11/1966 | Pensack et al...................... | 424/227 |
| 3,317,378 | 5/1967 | Woods et al........................ | 424/319 |
| 3,532,791 | 10/1970 | Johnston............................. | 424/227 |
| R23,767 | 1/1954 | Bersworth........................... | 260/519 |

Primary Examiner—Vincent D. Turner
Attorney, Agent, or Firm—Theodore Post; C. kenneth Bjork

[57] ABSTRACT

Methods and compositions for administering orally to a warm-blooded animal a tetracycline antibiotic and a potentiator therefor corresponding to the formula

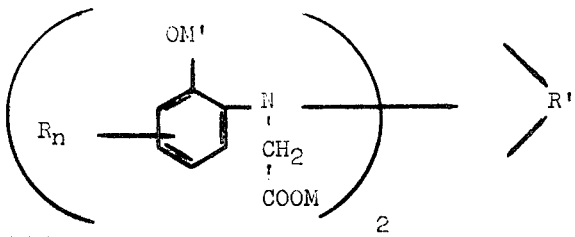

wherein M represents hydrogen, sodium, potassium or ammonium, and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and R' represents ethylene, propylene, or trimethylene.

9 Claims, No Drawings

CERTAIN GLYCINE DERIVATIVES AS POTENTIATARS FOR TETRACYCLINES

The present invention is concerned with the potentiation of tetracycline antibiotics.

The tetracycline antibiotics are a known group of biologically active octahydronaphthacene derivatives having the following essential structural features:

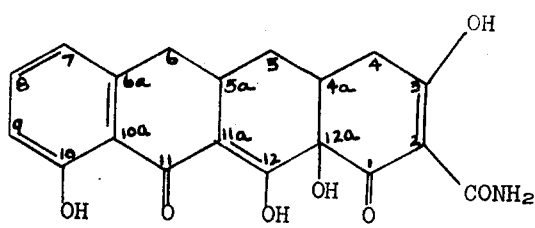

The number system indicated is that employed by Chemical Abstracts. A tautomeric relationship exists between the substituents at the 11, 11a, and 12 positions:

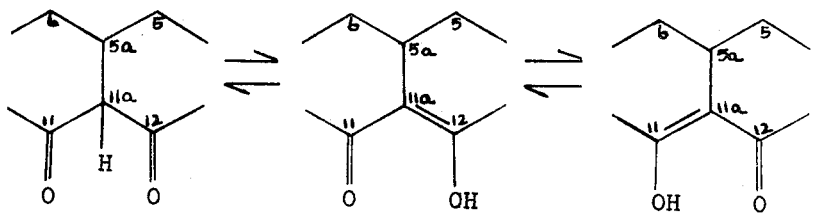

All of the tetracycline antibiotics comprise the structural unit thus described. In addition, each of the tetracycline antibiotics bears one or more yet other substituents. Commonly employed tetracycline antibiotics, and their respective substituents, are listed in the following table:

| Substituents: | Common Name |
|---|---|
| 4-N(CH$_3$)$_2$, 6-OH, 6-CH$_3$ | Tetracycline. |
| 4-N(CH$_3$)$_2$, 5-OH, 6-OH, 6-CH$_3$ | 5-oxytetracycline, or simply oxytetracycline. |
| 4-N(CH$_3$)$_2$, 6-OH, 6-CH$_3$, 7-Cl | 7-chlortetracycline, or simply chlortetracycline. |
| 4-N(CH$_3$)$_2$, 6-OH | 6-demethyltetracycline. |
| 4-N(CH$_3$)$_2$, 6-OH, 7-Br | 6-demethyl-7-bromtetracycline. |
| 4-N(CH$_3$)$_2$, 5-OH, 6-CH$_3$ | 6-deoxy-5-oxytetracycline. |
| 5-OH, 6-CH$_3$, 6-OH | 4-desdimethylamino-5-oxytetracycline. |
| 4-N(CH$_3$)$_2$, 6-CH$_3$ | 6-deoxytetracycline. |
| 4-N(CH$_3$)$_2$ | 6-deoxy-6-demethyltetracycline. |
| 4-N(CH$_3$)$_2$, 6-OH, 6-CH$_3$, 7-Br | 7-bromtetracycline, or simply bromtetracycline. |
| 4-N(CH$_3$)$_2$, 6-OH, 7-Cl | 6-demethyl-7-chlortetracycline |
| 6-OH, 6-CH$_3$ | 4-desdimethylaminotetracycline. |
| 6-OH, 6-CH$_3$, 7-Cl | 4-desdimethylamino-7-chlortetracycline. |
| 4-N(CH$_3$)$_2$, 5-OH, 6- =CH$_2$ | 6-deoxy-6-demethyl-6-methylene-5-oxytetracycline. |

While this table identifies the commonly employed tetracycline antibiotics, there are numerous other tetracycline antibiotics which contain the essential structural formula set forth above but which also bear other substituents in addition to, or in place of one or more of, the substituents identified in the Table. Representative such other tetracycline antibiotics include those taught in U.S. Pat. Nos. 2,984,686; 3,239,499; 3,239,501; 3,247,250; 3,250,809; 3,250,810; and 3,265,732.

The various tetracycline antibiotics can be employed directly or can be employed in the form of derivatives thereof, notably salts. Such salts include the calcium chloride and other similar complexes; inorganic acid addition salts such as sulfates, hydrohalides, and the like; the sodium, potassium, magnesium and calcium salts; and organic quaternary ammonium salts. Many of these salts are preferred because their use facilitates absorption by the animal body of the active moiety. For this reason, the monochloride salts are employed much more widely than the corresponding free base materials.

Thus, in the present specification and claims, the term "tetracycline antibiotic" is employed to describe a compound or derivative thereof which comprises the essential structural unit described foregoing and which exhibits to a greater or lesser degree that activity known to be exhibited by tetracycline itself. However, the identity of the particular tetracycline antibiotic employed is not critical in the practice of the present invention.

There are numerous areas of application of the tetracycline antibiotics in the treatment of warmblooded animals. Administration of the antibiotics is sometimes carried out to effect a cure of a specific disease, and in this instance, the administration may be of short duration. In other situations, the administration is carried out on a more or less continuous basis, usually at lower levels than those employed in short term administration, to serve as a prophylactic and/or growth stimulant. The antibiotics can be administered orally or by injection, but the former route is preferred, especially in the treatment of large numbers of domestic animals.

The most notable application of the tetracycline antibiotics in the treatment of domestic animals is in raising fowl. While the tetracycline antibiotics as well as numerous other antibiotics are sometimes incorporated in poultry feeds at low levels to serve as a prophylactic, the more important application of the tetracycline antibiotics is in the intermittent feeding of the antibiotics to control outbreaks of any of numerous diseases, including fowl cholera, fowl typhoid, blue comb, cecal and intestinal coccidiosis, and especially chronic respiratory disease (referred to as sinusitis in turkeys). The most readily apparent symptoms of this disease are a persistent respiratory noise, typically described as a "snick," poor feed conversion, and lowered egg production. The disease is highly infectious and in the absence of treatment is often fatal to a large portion of any infected flock.

The effectiveness of the tetracycline antibiotics in most of their numerous therapeutic and/or prophylactic applications is largely dependent upon the degree to which they are absorbed into the blood system and therefore made available throughout the body of the animal. However, it has long been known that the tetracycline antibiotics have an affinity for metals present in the digestive system, the most prevalent being calcium.

This affinity is exhibited even at low concentrations of metal, such as those normally found in the digestive tracts of warm-blooded animals. Accordingly, a substantial portion of the antibiotic is bound up in the digestive system, and its uptake is severely inhibited. As a result, even relatively large oral doses of the tetracycline antibiotics often fail to achieve a high enough level of antibiotic in the blood to obtain the desired therapeutic and/or prophylactic effects.

In view of this binding of the tetracycline antibiotics, the therapeutic and/or prophylactic efficacy of such antibiotics in most applications can be correlated accurately only with their presence in the blood system. Procedures have been developed to ascertain even very low blood levels of the tetracycline materials, and the antibiotic blood level is now taken as an accurate measure of efficacy. These procedures measure the amount of antibiotic at concentrations as low as 0.05 micrograms per milliliter, in the instance of chlortetracycline and its salts, and at concentrations as low as 0.15 micrograms per milliliter, in the instance of tetracycline and oxytetracycline and their salts.

Extensive attempts have been made to overcome the difficulty associated with oral administration of the tetracycline antibiotics. Most notably, the calcium content of feeds has been diminished as low as is consistent with feed manufacturing practices. When the antibiotics are incorporated in such low-calcium feeds, the absorption of the antibiotics into the blood system proceeds, in the absence of the interfering calcium, at a more reasonable rate. However, this practice suffers the disadvantage that is deprives the animal being treated of calcium vital to its growth. Hence, this method of treatment cannot be continued indefinitely. Yet if this treatment is to be effective, it must be continued for a long enough period of time that the antibiotic level in the blood reaches a sufficiently high, that is, therapeutic and/or prophylactic, level, and is maintained thereat for a sufficient period of time. Thus in practice, some growth depression often results from this type of treatment; or, if treatment is carried out for an insufficient period of time, the desired effects of antibiotic administration are incompletely achieved, And at best, even with such low-calcium feeds, a portion of the antibiotic, typically an expensive substance, is not utilized by the animal.

Also, certain well-known chelating agents, most notably ethylenediaminetetraacetic acid or its sodium salt, have been evaluated in feeds containing the antibiotics. However, it has been found that the use of ethylenediaminetetraacetic acid or its sodium salt is unacceptable since, while enhancing antibiotic absorption, it does so only at rates high enough that, according to one publication, marked growth depression results. The same publication notes that other chelating agents evaluated have been found to have the same disadvantage. In addition, the administration to animals of potentiating amounts of the ethylenediaminetetraacetic acid particularly in its more convenient sodium salt form, is generally accompanied by the occurrence of diarrhea in the animals.

In addition, terephthalic acid was discovered to increase the concentration of the tetracycline antibiotics in the blood, even in feeds containing the normal component of calcium. The mechanism by which terephthalic acid operates is unknown, but it appears that it operates by a mechanism other than calcium binding, possibly depression of renal secretion of the antibiotic. However, upon further evaluation, it was found that this use of the compound presented serious difficulties, and approval by the Federal Food and Drug Administration was not granted.

In another attempt to surmount the difficulty associated with oral administration, experiments were carried out to evaluate the effect of varying the calcium source. It was discovered that various calcium salts, even at normal calcium levels, exhibited different degrees of interference with the uptake of the tetracycline antibiotics. However, the differences in interference were found to be slight, and, moreover, those salts exhibiting less interference were generally deemed to be too expensive to warrant usage. Therefore, up to the present time, no method that is economically feasible and represents sound practice, has been found whereby, upon oral administration, the blood levels of the tetracycline type antibiotics can be, even temporarily, raised to be high enough to reliably effect the desired benefits without concomitant growth depression and/or other undesirable side effects.

In the absence of a satisfactory method, general practice at the present time in poultry raising consists of the intermittent use of (1) a regular feed having normal calcium content and no antibiotic and of (2) a low-calcium feed containing the tetracycline antibiotic at levels of 50 grams and more per ton of feed. This practice suffers the disadvantages previously discussed. An alternate method of treatment at the present time consists of the continuous use of a feed containing the antibiotic and a modest concentration of a selected calcium source which by nature exhibits less interference with antibiotic uptake. However, this manner of treatment is generally even less effective in achieving the disease control sought.

The inadequacy of these methods is indicated by the fact that in spite of treatment by either, flocks of poultry being slaughtered for market are found to contain as high as 30 percent of birds showing signs of the diseases which would have been controlled by higher blood levels of the tetracycline antibiotics. These diseased birds are considered unfit for human consumption and are discarded, causing the poultry producer a severe economic loss. A more effective method of administration is needed.

There has now been discovered a greatly improved method and composition for the oral administration of a tetracycline antibiotic. This method comprises, most broadly, administering orally to a warm blooded animal an effective amount of a tetracycline anitibiotic and a potentiating agent in an amount sufficient to potentiate the tetracycline antibiotic. In the present specification and claims, the term, "potentiate" and other forms of the same word are employed to refer to an enhancement of the therapeutic efficacy of an amount of a tetracycline antibiotic orally administered.

The potentiating agent to be employed in accordance with the present invention is a compound of the formula

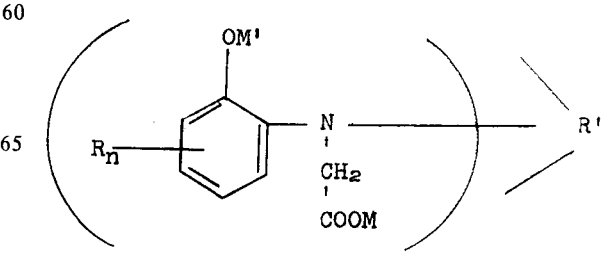

In the above and succeeding formulae in the present specification and claims, M represents hydrogen, alkali metal, or ammonium, and, M being hydrogen, M' represents hydrogen, or, M being alkali metal or ammonium, M' represents hydrogen or the same moiety represented by M; R in each of its n occurrences independently represents halo, hydroxy, loweralkyl, or loweralkoxy; n represents an integer of from 0 to 2, both inclusive; and R' represents ethylene, propylene, or trimethylene.

In the present specification and claims, the terms "loweralkyl" and "loweralkoxy" are employed to designate alkyl and alkoxy, radicals, respectively, wherein the alkyl portion is an alkyl radical being of from 1 to 4, both inclusive, carbon atoms; the term "alkali metal" is employed to designate sodium and potassium, only; and the terms "halide" and "halo" are employed to designate appearances of bromine, chlorine, and iodine, only.

The products to be employed as the present potentiating agent are prepared in known procedures. In these procedures, an o-aminophenol reactant of the formula:

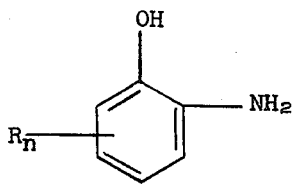

is reacted with an alkylene dibromide of the formula:

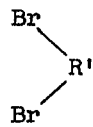

to obtain the corresponding 2,2'-(alkylenediimino)diphenol substance of the formula:

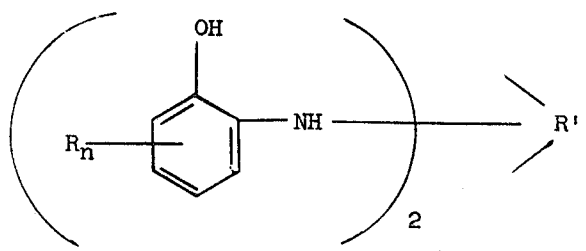

This substance is then reacted with chloroacetic acid to obtain the present potentiating agent wherein each of M and M' represents hydrogen. Under even slightly acidic conditions, however, this substance forms a lactone:

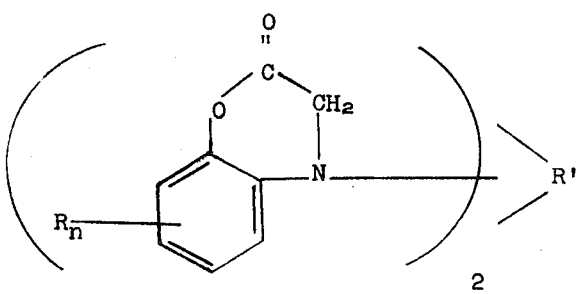

Conveniently and preferably, therefore, the present potentiating agent is employed as the tetrasodium, tetrapotassium, or tetraamonium salt; however, it is also possible to prepare and employ the present potentiating agent as the disodium, dipotassium, or diammonium salt. In this latter instance, salt formation occurs preferentially at the cite of the carboxy group. Those products to be employed in accordance with the present invention wherein M represents alkali metal or ammonium or both of M and M' represents alkali metal or ammonium are also prepared in conventional procedures. In these procedures, the corresponding product wherein M and M' represent hydrogen, conveniently as the lactone, is reacted with an alkali metal or ammonium hydroxide to obtain the desired products. When it is desired to prepare product wherein M represents alkali metal or ammonium and M' represents hydrogen, two moles of the hydroxide reactant are employed per mole of the starting substance wherein both M and M' represent hydrogen. Similarly, when it is desired to obtain a product wherein both M and M' represent alkali metal or ammonium, four moles of the hydroxide are employed per mole or the starting substance wherein both M and M' represent hydrogen.

The materials to be used as potentiating agent in accordance with the present invention are crystalline solid materials. It is not critical to the practice of the present invention that they be of high purity; in some instances, it may be economically preferred practice to use a larger gross amount of a less pure substance, to achieve desired activity, than to purify the substance. This practice is particularly applicable where the impurities present are inert or even, as is sometimes the case, beneficial in the nutrition of animals.

Representative products to be employed in accordance with the present invention include '-ethylenebis(N-(2-hydroxy-5-chlorophenyl)glycine), tetrasodium salt; N,N'-propylenebis(N-(2,4-dihydroxyphenyl)-glycine), tetrapotassium salts; N,N'-ethylenebis(N-(2-hydroxy-6-bromophenyl)glycine), tetraammonium salt; N,N'-trimethylenebis(N-(2-hydroxy-5-methoxyphenyl)glycine), tetrapotassium salt; N,N'-ethylenebis(N-(2-hydroxy-3-butoxyphenyl)glycine), disodium salt; N,N'-ethylenebis(N-(2-hydroxy-5-methylphenyl)glycine), dipotassium salt; N,N'-propylenebis(N-(2-hydroxy-4,5-diethoxyphenyl)glycine), diammonium salt; N,N'-ethylenebis(N-(2-hydroxy-5-tertbutylphenyl)glycine), tetrasodium salt; N,N'-propylene-bis(N-(2-hydroxy-3,5-dimethylphenyl)glycine), disodium salt; N,N'-ethylenebis(N-(2-hydroxy-3-bromo-5-tert-butylphenyl)glycine), tetrasodium salt; N,N'-ethylenebis(N-(2-hydroxy-5-iodophenyl)glycine), dipotassium salt; N,N'-ethylenebis(N-(2-hydroxy-3-isopropylphenyl)glycine), tetraammonium salt; N,N'-ethylenebis(N-(2-hydroxy-5-methoxyphenyl)glycine), tetrasodium salt; N,N'-ethylenebis(N-((N'-hydroxy-5-methylphenyl)glycine), dipotassium salt; N,N'-ethylenebis(N-(2-hydroxy-5-chlorophenyl)glycine), tetraammonium salt; N,N'-ethylenebis(N-(2-hydroxy-3-bromo-5-chlorophenyl)glycine), disodium salt; N,N'-propylenebis(N-(2-hydroxy-5-iodophenyl)glycine), diammonium salt; N,N'-propylenebis(N-(o-hydroxyphenyl)-glycine), disodium salt; and N,N'-ethylenebis(N-(o-hydroxyphenyl)glycine), diammonium salt. It is understood, however, that any of the foregoing representative substances can be employed as a free acid if employed under conditions which preclude lactone formation.

The present invention differs from the prior art in that, employing the methods and compositions of the present invention, it is possible conveniently and economically to establish higher ratios of concentration of tetracycline antibiotics in blood to concentration of tetracycline antibiotic in feed than have hitherto been possible. In the foregoing statement, "blood" means the blood of an animal being medicated by means of antibiotic-containing feed according to the prior art or the present invention. The new method provides excellent control and prevention of the infections against which the tetracycline antibiotics are effective. In addition, the time period needed for treatment with a tetracycline antibiotic is frequently substantially reduced. Contary to the prior art, the use of the present potentiating agents in a potentiating amount is not accompanied by growth depression. Moreover, the present invention provides economic benefits in the reduced amount of anitibiotic necessary, as well as in reduced loss of animals due to inadequate disease control by the antibiotics.

The mechanism by which the present invention operates has not been established. It is known that the potentiating agent to be employed in accordance with the present invention has the chemical properties of a chelating agent for some metals; however, as noted above, the chelating agents evaluated to date, notably ethylenediaminetetraacetic acid, have been found to be unacceptable in antibiotic potentiation. It is tentatively believed that the mechanism of the present potentiating agent is one of chelation. However, the possibility of a mechanism in which the excretion of antibiotic is retarded, or of yet other possible mechanisms, has not been excluded.

The oral administration, essentially simultaneously, of an at least prophylactic amount of a tetracycline antibiotic and a potentiating amount of the present potentiating agent is essential and critical to the practice of the present invention. However, the exact dosages supplied are not critical and will vary considerably depending upon a wide variety of factors, such as the animal concerned, the age of the animal, whether the antibiotic is to be employed for disease control (usually at higher rates) or for prophylactic purposes and/or growth stimulation (usually at lower rates), the particular antibiotic employed, and the like. The dosage of antibiotic, when employed in accordance with the present invention, can be of the same magnitude as the dosages in the prior art. However, in view of the potentiation effected in accordance with the present invention, the same antibiotic effect is generally achieved with lower dosages. Typically, an antibiotic dosage of from 1 to 8 milligrams of anitibiotic per kilogram of animal body weight is effective in the practice of the present invention. Higher amounts can be employed but seldom offer any advantage. Where administration is on a daily basis and disease is light, rates of from about 2 to 4 milligrams of antibiotic per kilogram of animal body weight are usually effective. Even lower rates, such as rates of from 0.05 to 1 milligram of antibiotic per kilogram of animal body weight are frequently employed with good results where disease is not prevalent and the main objective is a prophylactic treatment and/or growth stimulation.

Similarly, the dosage of the potentiating agent is not critical and can vary over a considerable range. Generally, potentiation is observed when the potentiating agent is employed at a dosage of from about 12 to 30 milligrams of agent per kilogram of animal body weight. Hence, potentiation is generally achieved when the potentiating agent is employed in an amount of from 3 to 6 times the amount of antibiotic employed. Lower rates of potentiating agent are sometimes adequate to effect the potentiation of the antibiotic. Higher rates, on the other hand, are unnecessary, and are seldom preferred. Moreover, their use is economically unjustifiable.

It is not critical that the antibiotic and the potentiating agent be administered in intimate mixture with one another, although it is necessary that the administration of both substances be carried out essentially simultaneously. By "essentially simultaneously" is meant a time relationship such that the administration results in the simultaneous presence in substantially the same region of the digestive system of an animal thus medicated, of the tetracycline antibiotic and the potentiating agent. Also, one of the substances can be administered in one feed and the other substance in another feed, often a supplemental food source such as a salt lick, or the like. However, due to the variation of intake which is possible with this type of treatment, it is seldom preferred. Generally, therefore, it is preferred that both substances be administered together, that is, by the administration of a composition comprising both an effective amount of the antibiotic and a potentiating amount of the potentiating agent. In this manner of treatment, the amounts administered and the ratio of one to the other are more readily controlled.

When the method of the present invention is carried out by the administration of a composition comprising both substances, the exact nature of the composition is not critical. For example, the composition can be a liquid or a finely divided solid. In some instances, it may be adequate to administer the two substances in the form of a tablet, capsule, or other similar form. However, administration by this route constitutes an additional step which, especially in the raising of large groups of domestic animals, is undesirable. For this reason, and also because the antibiotic is more effective if administered regularly portionwise over a period of time, the method of the present invention is preferably carried out in conjunction with the regular supplying to the animals of necessary substances — notably food, water, and such supplemental compositions as are fed to a given animal. Of these routes, administration in feed is generally the most preferred route.

Regardless of whether the antibiotic and potentiating agent are administered separately or together, the method of the present invention can be carried out by administration of unmodified antibiotic and unmodified potentiating agent. However, the present invention can also be implemented with a composition comprising antibiotic and another composition comprising potentiating agent, or with a composition comprising both antibiotic and potentiating agent. Such compositions, in addition to the antibiotic and/or potentiating agent, can contain one or more of a plurality of edible adjuvants. Representative edible adjuvants include liquid feeds and/or carriers, such as water, ethanol, skim milk, edible oils, propylene glycol, and syrups; solid feeds and/or carriers, such as grain rations and the like; liquid or solid surface active dispersing agents; and feed additives, such as minerals, vitamins, antioxidants, coccidiostats, anthelmintic materials, growth stimulants, and other antibiotic materials, such as members of the penicillin group, sulfa group, streptomycin group, neomycin group, and of yet other groups of antibiotic materials. The precise identity of components is not critical but will vary depending upon the animal concerned, its age, whether the composition is to serve as an essentially complete animal feed or as a feed concentrate, and upon yet other factors. Similarly, the exact concentration of tetracycline antibiotic and potentiating agent is not critical and can vary provided only that enough of the composition (or compositions, where the tetracycline antibiotic is present in one composition and the potentiating agent is present in another composition) is ingested to provide the required internal amount of antibiotic and potentiating agent.

In one embodiment, there is employed an animal feed concentrate comprising from 0.5 to 99.5 percent of a tetracycline antibiotic and from 99.5 to 0.5 percent of the present potentiating agent, both percentages being expressed as percentages by weight of total composition, and any other ingredients being normal animal feed concentrate ingredients. Thus, such animal feed concentrate can comprise only the tetracycline antibiotic and the potentiating agent, or it can comprise the tetracycline antibiotic and potentiating agent, and, in addition, one or more edible adjuvants, such as the representative edible adjuvants set forth foregoing. Such a composition is adapted to be administered directly to an animal - particularly where it is administered in conjunction with another feed which completes the dietary requirements of the animal; or such a composition can serve as a concentrate and be further mixed with other adjuvants of the type set forth above to obtain an essentially complete animal feed. While the exact concentration of antibiotic and potentiating agent in the animal feed concentrate is not critical, a preferred concentration range is from 2 to 20 percent of the tetracycline antibiotic and from 98 to 80 percent of the potentiating agent, both percentages being expressed as percentages by weight of total composition. Such animal feed concentrate compositions are particularly preferred in that, without addition of a further amount of either antibiotic and/or potentiating agent, they facilitate the administration to the animal of antibiotic and potentiating agent in a preferred ratio of one to the other, regardless of whether they are administered directly to animals or mixed with other adjuvants to obtain an animal feed which is then fed to animals.

Thus, in another embodiment there is employed an animal feed, that is, a composition which serves as the principal food ration. With such a composition, satisfactory results are obtained with a ration containing only minor amounts of tetracycline antibiotic and potentiating agent. The exact amounts of antibiotic and potentiating agent are dependent upon the food and water consumption and feeding and watering habits of the animal concerned, and upon the prophylactic and/or therapeutic effect sought from administration of the tetracycline antibiotics. In the instance of the tetracycline antibiotic, there is employed an effective amount, that is, an amount which is sufficient to provide at least a prophylactic effect. Generally, therefore, the antibiotic is employed at rates of from about 0.001 percent of the animal feed (about 9 grams per ton). Higher concentrations of the antibiotics, such as concentrations of up to 900 grams per ton, or higher, are employed in many applications, although the Federal Food and Drug Administration has set a maximum level for administration under some circumstances. Generally, this level is 200 grams per ton or less. The preferred effective amount of the tetracycline antibiotic is an amount of from 50 to 200 grams per ton.

The amount of the present potentiating agent which is effective to potentiate the tetracycline antibiotic also varies. Generally, good results are obtained when the agent is present in the animal feed in a concentration of from about 0.010 percent (about 90 grams per ton) to about 0.40 percent (about 3,600 grams per ton). A preferred amount of the potentiating agent is that representing a concentration of from 0.10 to 0.20 percent of the animal feed, or, yet more preferred, about 0.15 percent of the animal feed. As noted, however, the appropriate amount varies, depending upon, among other factors, the animal concerned. With fowl, the preferred practice has been found to comprise the administration of an animal feed containing the antibiotic in a concentration of 200 grams per ton and the potentiating agent in a concentration of about 0.15 percent.

When it is convenient to administer the tetracycline antibiotic and the present potentiating agent in water, concentrations in water should be adjusted according to the known water demand of the animal to be treated. Animals with low water demand are treated with higher water concentrations, and animals with higher water demand are effectively treated with the antibiotic and potentiating agent in lower concentrations. In this situation, the total amount ingested should be adjusted so as to approximate the same intake per unit body weight as would be achieved in other methods of administration.

Liquid feed compositions containing the desired amount of antibiotic and/or potentiating agent can be prepared by dispersing the substances in liquids, such as edible oils, or water, with or without the aid of a suitable surface active dispersing agent such as an ionic or non-ionic surface active agent. Suitable surface active dispersing agents include the glycerol and sorbitan mono-esters of fatty acids and the polyoxyalkylene derivatives of fatty alcohols and of sorbitan esters. The aqueous compositions can contain one or more water-immiscible organic liquids as an aid in dispersing the active agents.

In the preparation of solid feed compositions, the antibiotic and/or potentiating agent can be mechanically ground with an edible solid such as cereal meal, including ground yellow corn and ground oats; finely ground meat and bone scraps, or a solid surface active dispersing agent such as finely divided bentonite or fuller's earth. These compositions can be employed directly to supply a part or all of the ration. Also, the antibiotic and/or potentiating agent can be dissolved in an organic solvent such as alcohol or acetone and the resulting mixture dispersed in an animal feed which, if desired, is then dried to remove the solvent. The antibiotic and potentiating agent can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

The present potentiating agent synergizes the use of ethylenediaminetetraacetic acid, and of its sodium salt, at rates sufficiently low that the growth depression previously noted for these substances is eliminated or markedly reduced. Accordingly, the present invention comprehends the joint use of potentiating agents as herein defined and of ethylenediaminetetraacetic acid, or its sodium salt.

Preferred products to be employed in accordance with the present invention are those of the formula

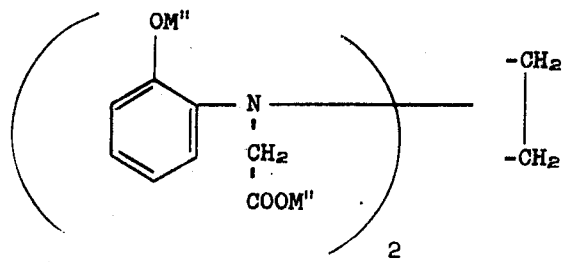

In the present specification and claims, R'', in each of its occurrences, represents the same moiety selected from the group consisting of alkali metal and ammonium. These products are distinguished in that they exhibit to an enhanced degree the potentiating activity exhibited by all of the products to be employed in accordance with the present invention.

The following examples illustrate the present invention and will enable those skilled in the art to practice the same.

EXAMPLE 1

In numerous evaluations, in poultry, of potentiating agent to be employed in accordance with the present invention, modified poultry feed, hereinafter designated the "modified basic ration" was employed. This modified basic ration was obtained by the modification which consisted of deleting dicalcium phosphate and ground limestone from the following standard formula for poultry feed:

|  | Percent of Ration |
| --- | --- |
| Yellow corn meal | 58.65 |
| Corn gluten meal | 2.50 |
| Soybean meal | 24.75 |
| Fish meal | 6.25 |
| Stabilized animal fat | 3.75 |
| Alfalfa meal | 1.25 |
| Limestone, ground | 0.75 |
| Dicalcium phosphate | 1.25 |
| Salt (NaCl) | 0.30 |
| Vitamin supplement | 0.50 |
| Mineral supplement | 0.05 |
|  | 100.00 |

Hence, the modified basic ration employed in the evaluations was of the above approximate composition but for the absence of dicalcium phosphate and ground limestone. Upon analysis, it was found that the modified basic ration contained approximately 0.39 percent calcium and 0.50 percent phosphorus. No antibiotic of any type was present in the modified basic ration.

In a first operation, two groups of young chicks, of an age of about three weeks, were employed. Each group comprised approximately equal numbers of each sex. All of the chicks were in good health. In this operation, one group, the control group, was fed a diet consisting of the modified basic ration to which there had been added tetracycline hydrochloride, only, in an amount to provide a concentration of 400 grams per ton of resulting feed. The second group of chicks, the treated group, was fed a diet which consisted of the modified basic ration to which there had been added tetracycline hydrochloride as well as N,N'-ethylenebis(N-(o-hydroxyphenyl)glycine, as the tetrasodium salt. In this latter diet, the "treated diet," the additives were present in a concentration of 400 grams of tetracycline hydrochloride per ton of ultimate treated diet and 0.15 percent of the N,N'-ethylenebis(N-(o-hydroxyphenyl)glycine), the percentage expressed as weight of potentiating agent by weight of the ultimate treated diet.

Feeding of the two groups was begun simultaneously, both groups being maintained during the course of the evaluations under the same conditions, with unrestricted access to water, their conditions differing only in the composition of the diet. Feeding was continued for a period of about 5 days. At the end of this period, all of the chicks were bled, and the blood from each chick analyzed in conventional techniques to determine the level of tetracycline antibiotic present in the blood. In this operation, it was found that the average blood level of tetracycline antibiotic for the treated group of chicks was 0.90 microgram per milliliter, whereas in the control group, the tetracycline antibiotic level in the blood was found to be only 0.33 microgram per milliliter.

EXAMPLE 2

Results essentially the same as those reported in Example 1 are obtained when the tetrapotassium salt of N,N'-ethylenebis(N-(o-hydroxyphenyl)glycine) is evaluated in the procedures of Example 1 except that the tetracycline antibiotic is oxytetracycline hydrochloride. In these operations, the tetrapotassium salt is employed in an amount equivalent on a molecular basis to the amount of the tetrasodium salt employed in Example 1.

EXAMPLE 3

Another operation was carried out in accordance with the procedures of Example 1. In this operation, numerous treated groups, and a control group, were employed. As in Example 1, the antibiotic, tetracycline hydrochloride, was present in all diets in the concentration of 400 grams per ton of total feed. However, the diet of each group of chicks contained an amount, from zero to 0.15 percent, of N,N'-ethylenebis(N-(o-hydroxyphenyl)glycine) by weight of total diet. The concentration of the potentiating agent in the diet, expressed as percent by weight of total diet, for a group of chicks at each concentration level, and the blood levels ascertained, are as set forth in the following table.

TABLE I

| Concentration of N,N'-ethylene-bis(N-(o-hydroxyphenyl)glycine) in Diet | Tetracycline Antibiotic Level in Blood in Micrograms per Milliliter |
| --- | --- |
| 0   (control) | 0.38 |
| 0.05 | 0.59 |
| 0.10 | 0.63 |
| 0.15 | 0.72 |

EXAMPLE 4

Results essentially the same as those reported in Example 3 are obtained when evaluating the tetraammonium salt of N,N'-ethylenebis(N-(o-hydroxyphenyl)-glycine) in the procedures of Example 3, employing an amount of the tetraammonium salt equivalent on a molecular basis to the amount of the tetrasodium salt employed in Example 3.

EXAMPLE 5

Results essentially the same as those reported in Example 3 are obtained when employing chlortetracycline as the tetracycline antibiotic.

In the foregoing specification, the term "ton" is used to mean 2000 pounds. Also in the foregoing specification, the blood level of the tetracycline antibiotic is uniformly the antibiotic level in the blood serum. This is in accord with the standardized procedures employed in evaluating the efficacy of the tetracycline antibiotics, in these procedures the solids are removed from the whole blood by heating and subsequent centrifuging, and the resulting serum analyzed for its content of the tetracycline antibiotic.

In the appended claims, the term "calcium-diminished animal feed" is employed to designate an animal feed containing not more than about 1 percent of calcium.

I claim:

1. A method useful for increasing the blood level of a tetracycline antibiotic which comprises administering orally and essentially simultaneously to a warm-blooded animal both of (A) a tetracycline antibiotic in an amount of from 0.05 to 8 milligrams of antibiotic per kilogram of animal body weight and (B) N,N'-ethylenebis(N-(o-hydroxyphenyl)glycine) or its tetrasodium, tetrapotassium or tetraammonium salt as a potentiating agent in an amount of from 0.05 to 0.15 percent by weight, on a diet basis.

2. A method useful for increasing the blood level of a tetracycline antibiotic which comprises administering orally to a warm-blooded animal a composition comprising both of a tetracycline antibiotic in an amount of from 0.05 to 8 milligrams of antibiotic per kilogram of animal body weight and N,N'-ethylenebis(N-(o-hydroxyphenyl)glycine) or its tetrasodium, tetrapotassium or tetraammonium salt as a potentiating agent in an amount of from 0.05 to 0.15 percent by weight on a diet basis.

3. The method of claim 2 wherein the composition is an animal feed.

4. The method of claim 3 wherein the animal is a fowl.

5. The method of claim 4 wherein the animal feed is a calcium-diminished animal feed.

6. The method of claim 3 wherein the tetracycline antibiotic is tetracycline hydrochloride.

7. The method of claim 3 wherein the tetracycline antibiotic is oxytetracycline hydrochloride.

8. The method of claim 3 wherein the tetracycline antibiotic is chlortetracycline hydrochloride.

9. An animal feed comprising (A) from 0.001 to 0.1 weight percent of a tetracycline antibiotic and (B) from 0.05 to 0.15 weight percent of N,N'-ethylenebis(N-(o-hydroxyphenyl)glycine or its tetrasodium, tetrapotassium or tetraammonium salt as a potentiating agent, said potentiating agent being useful for increasing the blood level of said tetracycline antibiotic.

* * * * *

UNITED STATES PATENT OFFICE
CERTIFICATE OF CORRECTION

PATENT NO. : 3,863,009
DATED : January 28, 1975
INVENTOR(S) : Charles Johnston

It is certified that error appears in the above-identified patent and that said Letters Patent are hereby corrected as shown below:

On the title page, in the title of the patent, "POTENTIATARS" should read -- POTENTIATORS --;
in the Attorney, Agent or Firm reference, "kenneth" is in lower case and should read -- Kenneth --.

Column 1, in the title of the patent, "POTENTIATARS" should read -- POTENTIATORS --.

Column 3, line 32, "is deprives" should read -- it deprives --;
line 59, "acid particularly" should read -- acid, particularly --.

Column 6, line 21, "per mole or" should read -- per mole of --;
line 37, "'-ethylenebis(N-(2-hydroxy-5-chlorophenyl)-glycine)," should read -- N,N'-ethylenebis(N-(2-hydroxy-5--chlorophenyl)glycine), --;
line 39, "salts" should read -- salt --; and
line 57, "N,N'-ethylenebis(N-((N'-hydroxy-" should read -- "N,N'-ethylenebis(N-(2-hydroxy- --.

Column 7, line 15, "Contary" should read -- Contrary --.

Signed and Sealed this twenty-second Day of July 1975

[SEAL]

Attest:

RUTH C. MASON
Attesting Officer

C. MARSHALL DANN
Commissioner of Patents and Trademarks